| United States Patent | [15] | 3,659,896 |
| Smith et al. | [45] | May 2, 1972 |

[54] ADHESIVE SEMI-CURED SEALING STRIP FOR AUTOMOBILE WINDSHIELD

[72] Inventors: Daniel J. Smith, Washington Crossing, Pa.; Earl H. Sorg, Trenton, N.J.; Elmer V. O'Grady, Yardley; Fred Walters, Levittown, both of Pa.

[73] Assignee: Thiokol Chemical Corporation, Bristol, Pa.

[22] Filed: Mar. 17, 1970

[21] Appl. No.: 20,206

[52] U.S. Cl. ..........................296/93, 52/203, 52/403, 260/37 R
[51] Int. Cl. .................C08g 51/10, C08g 51/08, B60q 1/02
[58] Field of Search.............260/37 R; 296/84, 53; 52/203, 52/403; 269/93

[56] References Cited

UNITED STATES PATENTS

| 3,022,870 | 2/1962 | John et al. | 260/37 R X |
| 3,499,864 | 3/1970 | Millen | 260/37 R X |
| 3,518,211 | 6/1970 | Downs et al. | 260/37 R X |
| 3,225,017 | 12/1965 | Seegman et al. | 260/37 R X |
| 3,416,833 | 12/1968 | Griffin | 296/93 |
| 3,387,416 | 6/1968 | Martin | 52/403 |
| 3,348,351 | 10/1967 | Citarel et al. | 52/403 X |

*Primary Examiner*—Lewis T. Jacobs
*Attorney*—Thomas W. Brennan

[57] ABSTRACT

An automobile windshield mounting and sealing means is provided by means of a preformed, adhesive, curable sealing strip comprising a thiol terminated synthetic polymer, particularly a liquid polysulfide polymer, which has been made or modified, e.g. partially cured or blended to increase its molecular weight to at least about 13,000 and its viscosity at 25°C. to at least about 6,000 poises and which has been compounded with a mixture of fibrous and non-fibrous fillers, extenders, curing agent and other ingredients to form an extrudable, semi-cured, curable resilient polymeric sealing composition which is extruded to sealing strip form, which is substantially immediately functional as a windshield glass and the windshield receiving frame on an automobile body, and which further cures in the presence of atmospheric moisture under ambient room temperature and weather conditions in the windshield frame of an automobile to a moderately hard, strongly cohesive, resilient, strongly adhered sealing strip.

12 Claims, 4 Drawing Figures

Patented May 2, 1972  3,659,896

Daniel J. Smith
Earl H. Sorg
Elmer V. O'Grady
Fred Walters
INVENTORS

BY Emil W. Milan
ATTORNEY

ADHESIVE SEMI-CURED SEALING STRIP FOR AUTOMOBILE WINDSHIELD

BACKGROUND OF THE INVENTION

1. Field of the Invention

The invention relates to a method and means for adhesively fastening and sealing a windshield to an automotive vehicle.

2. Description of the Prior Art

In recent years, automobile windshields have been attached to automobile windshield retaining frames on automobile bodies by means of resilient synthetic rubber or polymeric resin sealing strips which have been coated with at least one adhesive material capable of adhering the sealing strip to the glass surface on one side and to the metal of the automobile body on the other side. The windshield is then further retained in the frame by ornamental metal strips which are screwed or otherwise fastened to the automobile body.

The compositions used for the sealing strips usually have been made from cured or vulcanized synthetic rubber or other synthetic elastomeric material compounded with fillers and other known ingredients to provide the hardness and resiliency required in a suitable sealing strip material. In some formulations, in order to cause the sealing strip to adhere sealingly to the glass and to the metal, adhesive materials have been compounded into the composition before it is cured. The adhesive then is activated before use of the sealing strip by wiping or brushing the surfaces of the sealing strip with an activating solvent, or, preferably, with a solution of the same adhesive in a suitable organic solvent which serves to solvate the surface of the sealing strip and to cause it to bond with the new layer of adhesive, and in turn, with the metal and glass surfaces against which it was pressed. After being activated, i.e. tackified with the solvent or the adhesive solution, the sealing strip was then allowed to stand to remove most of the solvent, leaving the strip in a tacky or "sticky" condition. The sealing strip then had to be carefully handled in its sticky condition and carefully positioned around the periphery of the inner side of the windshield. The windshield then was lifted, e.g. by means of a pair of suction cups attached to the outside surface of the glass, and was carefully positioned into the frame of the automobile body. The windshield was then clamped to the automobile body and held in the clamped position to complete the bonding between the sealing strip and the glass on one surface and the sealing strip and the metal surface on the other surface.

In a second method of the prior art, a vulcanized, adhesively treated synthetic rubber dam is permanently positioned and adhered to the inner surface of the windshield at a distance of about one-half inch to three-fourths inch from the edge of the glass. The dam has a height of about one-half inch and is generally inwardly coved on the side facing the edge of the glass. The space between the edge of the glass and the dam is then filled with a deposit of free-flowing curable sealant material which is gunned along the glass surface. An example of the latter type of curable sealant and its use is that taught by Citarel and Giordano in U.S. Pat. No. 3,348,351. The windshield and its dam and sealant then are lifted and clamped into position on the automobile body substantially in the same way as described above. The curable sealant adsorbs moisture from the air and cures from its uncured, free-flowing state to a hard resilient windshield sealant over a period of time lasting from a few days to as much at 3 months, depending on ambient conditions of temperature and humidity. This second method of adhering and sealing a windshield to the automobile windshield frame requires careful application of the free-flowing sealant during the gunning stage. Furthermore, the sealant ingredients used in making the gunnable sealant usually must be mixed with a curing or an activating agent a very short time before use. Generally, this is done with a mixing gun wherein the two compositions of a two-part type of sealant composition, consisting of the major sealant ingredients in one part and curing paste in the other, are blended in the gun nozzle just before deposition of the sealant on the windshield. Thus, while this second method provides a means for obtaining an effective windshield sealant, it requires considerable preparation and careful timing of steps to achieve the desired advantages of the system. Care must be taken to avoid smearing of the glass and automobile body with the gunnable sealant.

The resiliency and hardness of the windshield sealing strip are critical properties of the strip. The strip must be sufficiently resilient to permit it to be clamped in a water-tight fit completely along the inner surface of the glass of the windshield on one side and similarly to fit along the periphery of the windshield frame on the body of the automobile. Since the glass of the windshield and the windshield-retaining frame of the body each usually are curved in several different arcs originating from different centers of radii, the peripheries of the windshield and frame generally are quite complex and make clamping of the windshield in a water-tight fit difficult. Subsequently, further sealing of portions of the sealing strip may become necessary to prevent leakage of water into the automobile.

The hardness of the sealing strip is critical to the stability of the strip. If the strip is too soft, it may cold flow at elevated ambient summer temperatures, causing the windshield to become loosened, and to flow on the glass, where it may become visible and may even obstruct the view. If the strip is too hard, the strip material may develop cracks or lose its cohesiveness and resiliency in extremely cold ambient winter temperatures and may not absorb the shock of an impact. Also, the glass may be fractured by the stresses created.

Another problem which arises and which is due to the materials used in compounding the sealing strip is that of deterioration of the composition of the cured strip by the elements, such as heat, cold, ice, snow, water, and sunlight; by air pollutants in the form of various organic and inorganic gases and liquids; and by various solvents, salts, windshield wiper solutions, and car washing detergents with which at least some portions of the sealing strip come into direct contact during the life of the automobile.

Assuming that the sealing strip composition has the optimum degrees of hardness, resiliency and physical and chemical characteristics necessary to withstand deterioration, the sealing strip additionally must have an adequate yield or tensile strength so that it coheres strongly enough to retain the windshield in its sealed condition in the windshield frame at least under normal deceleration and impact and vibration conditions to which the automobile will be subjected during driving. The adhesive strength of the sealing strip material also must be great enough to withstand these forces over the life of the automobile.

SUMMARY OF THE INVENTION

The present invention comprises compounding a semi-cured, curable polymeric sealing strip composition comprising a liquid polymer having thiol terminal groups, particularly a liquid polysulfide polymer, an organic extender, fibrous and non-fibrous fillers, an activatable curing agent, an ultraviolet light stabilizer, and preferably an adhesive additive; shaping the composition into a continuous elongated sealing strip, or tape, form having cross-sectional dimensions suitable for sealingly mounting an automobile windshield into a windshield frame of an automobile; pressing the semi-cured, curable sealing strip into the channel of an automobile windshield frame or along the periphery of the inner surface of a windshield, pressing the windshield into the windshield frame of the automobile body and holding the windshield in position until the sealing strip is securely adhered to the metal of the automobile body and to the glass. The adhesive and cohesive properties of the semi-cured, curable sealing strip are such that adhesion of the strip to both the glass and the metal takes place within seconds and the windshield is immediately functional as a sealed windshield.

The semi-cured, curable polymer sealing strip composition essentially comprises a liquid polymer having a molecular weight to viscosity relationship such that the compounded semi-cured composition when compounded with a mixture of fibrous and non-fibrous fillers will possess the rheological properties needed to provide the moderate hardness, resiliency and cohesiveness properties required in the sealing strip both during its handling prior to curing and after it has cured in the windshield frame of the automobile where it has been used. The term "rheological properties" as used herein refers to the consistency, handling characteristics, and physical and performance properties required in the semi-cured sealing strip composition for producing a curable sealing strip which cures in use in the presence of atmospheric moisture under ambient room temperature and weather conditions to a moderately hard, strongly cohesive, resilient, strongly adhered sealing strip.

More specifically, the invention comprises use of a liquid polysulfide polymer having a sufficiently high molecular weight and a sufficiently high viscosity to provide "wet" strength for extrusion and handling of the semi-cured strip, or tape composition, and to provide initially strong cohesive and adhesive strengths for bonding purposes. Body characteristics of the polymer are improved by means of fibrous fillers. With increases in molecular weight of the polymer, lower amounts of the fibrous bodying fillers are needed to provide the proper "wet" strength and handling characteristics. According to the invention, the properties desired in the cured tape are controlled by obtaining an optimum relationship between the molecular weight of the polymer, the viscosity of the polymer, and the amount of fibrous fillers used in preparing a particular sealing strip composition.

The necessary high molecular weight and viscosity in the liquid polymer used to practice the present invention are obtained by using a liquid polymer which is produced commercially as close as practical to the necessary molecular weight and viscosity and additionally partially curing it, or by using a liquid polymer of a relatively low molecular weight and partially curing the latter polymer to the necessary higher molecular weight and viscosity. In the case of liquid polysulfide polymers, commercially available polymers are provided in molecular weight and viscosity ranges which are substantially below those required for preparing the sealing strip of the present invention. The invention is particularly concerned with the preparation of an improved sealing strip for an automobile windshield from such commercially available relatively low molecular weight liquid polysulfide polymers. Furthermore, the invention is concerned with a method for more efficiently mounting a windshield into a bonded relationship with the metal automobile frame in which it is to be retained.

In the preferred embodiments of the invention, the uncured, liquid thiol-terminated polymer used is a liquid polysulfide polymer whose molecular weight, when used as the sole liquid polymer, is at least about 8,000 and preferably is in the range from about 9,000 to 14,000. Correspondingly, the viscosity of the polymer is at least about 1,000 poises and preferably is in the range from about 1,200 to about 6,000 poises.

The molecular weights of LP-32 and LP-31 liquid polysulfide polymers which are commercially produced normally range from about 4,000 to about 8,000, and under special processing conditions may be produced up to molecular weights of about 8,000 to about 14,000. In order to obtain higher molecular weighted liquid polymers for use in practice of the invention, it has been found advantageous to blend a low molecular weight commercially available liquid polysulfide polymer with a sufficient quantity of a millable gum elastomer, e.g. a polysulfide rubber having a substantially higher molecular weight, e.g. about 80,000, as more fully described later herein.

For preparing the sealing strip composition, the thiol-terminated liquid polymer may be obtained or prepared as a low molecular weighted polymer whose molecular weight can be raised to the necessary defined molecular weight range. The polymer also can be obtained or prepared as a lower molecular weighted polymer blend. The molecular weight can be increased in situ prior to or during compounding of the polymer into the sealing strip composition, and the other ingredients of the composition may then be added thereto. The latter result may be obtained, e.g., by reacting a small percentage of the mercaptan (thiol) terminals of the polymer with a curing agent, e.g. an organic curing agent, such as, tertiary butyl hydroperoxide, or an inorganic peroxide, such as $CaO_2$, $PbO_2$, or $MnO_2$, thereby forming disulfide linkages in the polymer during blending. A desiccant material, e.g. BaO, CaO, or a molecular sieve material, such as a synthetic zeolite, is then introduced into the polymeric composition to adsorb water formed during this partial curing of the polymer. Reinforcing fillers, particularly fibrous fillers, such as asbestos, and non-fibrous fillers, such as alkaline metal carbonates and carbon blacks, and extenders, such as liquid plasticizers, are added to the composition to impart body and strength so that the semi-cured, curable sealing strip will be able to withstand a load or compression force without flowing unduly before the polymer cures to a final set. Other compounding ingredients usually used in windshield sealants can then be added to the composition. These include ultra-violet light stabilizers, cure accelerators, adhesives, and the like. Additional amounts of the desiccant material may then be added, if required, to adsorb any water introduced with the additional compounding ingredients. Finally, a moisture-initiated curing agent material, such as $CaO_2$, is incorporated into the composition for final complete curing of the semi-cured, curable sealing strip composition on its exposure to atmospheric moisture in its use as a sealant.

BRIEF DESCRIPTION OF THE DRAWING

The drawing illustrates the curable sealing strip of the invention and its use in mounting a windshield to an automobile body windshield frame. In the drawing.

DESCRIPTION OF THE PREFERRED EMBODIMENTS

The adhesive, semi-cured, curable sealing strip of this invention is preferably prepared from a polymeric composition comprising at least one cured liquid polymer having thiol terminal groups, particularly a liquid polysulfide polymer, having a molecular weight of at least about 13,000 and a viscosity at 25°C. of at least about 6,000 poises. Uncured liquid polymer having a molecular weight of less than about 13,000 is preferably semi-cured to have a molecular weight in the range of about 15,000 to 25,000 and a viscosity at 25°C. in the range of about 6,000 to 70,000 poises. Also, such preferred uncured liquid polysulfide polymer may be blended with sufficient ST polysulfide rubber which will interact therewith to form a polymer blend having a molecular weight and a viscosity within the above ranges.

The liquid polymer having thiol terminal groups may be a polymer from the class of curable —SH containing polymers which contain a plurality of —SH groups and which includes:

A. liquid polythiopolymercaptan polymers such as those described in Patrick et al. U.S. Pat No. 2,466,963;
B. liquid polysulfide polymers containing a plurality of —SSH groups such as those described in U.S. Ser. No. 290,637 filed June 26, 1963, now abandoned;

C. liquid —SH terminated polyethers such as —SH terminated polypropylene glycol as disclosed in U.S. Pat. No. 3,258,495;

D. —SH terminated hydrocarbon polymers such as —SH terminated polybutadiene (Chem. and Eng. News Apr. 4, 1966, p. 37) —SH terminated butadiene/acrylonitrile copolymers and the alkaneopolythiol, aralkanepolythiol, and arenepolythiol polymers disclosed in U.S. Pats. Nos. 2,230,390; 2,436,137 and 3,243,411;

E. liquid —SH terminated polyurethanes such as those disclosed in U.S. Pat. No. 3,446,780;

F. liquid —SH terminated poly(alkylene sulfide) polymers such as those disclosed in U.S. Pats. Nos. 3,056,841 and 3,070,580; and

G. other polythiol polymers which are disclosed in U.S. Pat. No. 3,402,155, all of which patents are incorporated herein by way of reference.

More specifically, the polythiol polymers upon which the elastomeric compositions of this invention are based are those polymers containing an average of at least two —SH groups per molecule and include, for example, and preferably, the liquid polysulfide polymers. The —SH group containing polysulfide polymers upon which the compositions used in practice of this invention are based are organic polymeric materials which are liquid at room temperature and which contain recurring polysulfide linkages, i.e., $-(S_n)-$ in the polymeric backbone where $n$ is, on the average, about 1.5 to 5. These polymers include, for example, those liquid polythiopolymercaptan polymera as are disclosed, as noted above, in U.S. Pat. No. 2,466,963 and which may be represented by the formula $HS(R-S-S)_nRSH$ where R is a hydrocarbon, oxahydrocarbon or thiahydrocarbon radical such as the ethyl formal radical ($-CH_2-Ch_2-O-CH_2-O-CH_2-CH_2-$), the butyl formal radical ($-Ch_2-CH_2-CH_2-Ch_2-O-CH_2-O-CH_2-CH_2-CH_2-CH_2-$), the ethyl ether radical ($-CH_2-CH_2-O-CH_2-CH_2-$), and the butyl ether radical ($-Ch_2-CH_2-CH_2-CH_2-O-CH_2-CH_2-CH_2-CH_2-$), and $n$ will vary from about 2 to 70, and preferably from about 4 to 23. These liquid polysulfide polymers have viscosities ranging from about 300 to about 150,000 centipoises at room temperature. Other —SH group containing polysulfide polymers are the —SSH terminated polymers, such as those disclosed in application U.S. Ser. No. 290,637 filed June 26, 1963, now abandoned, in the name of E. R. Bertozzi and the blocked —SSH terminated polymers, such as those disclosed in U.S. Pat. No. 3,422,077.

Also useful as polythiol polymers in practice of this invention are, for example, the thiol terminated polythiomethylene polymers such as those described in U.S. Pats. Nos. 3,056,841 and 3,070,580; the thiol terminated polyoxyalkylene glycol polymers such as those described in U.S. Pat. No. 3,258,495; the alkanepolythiol, aralkanepolythiol, and arenepolythiol polymers, such as those disclosed in the above-mentioned U.S. Pat. Nos. 2,230,390; 2,436,137; and 3,243,411; the polymeric polymercaptans formed by reacting a plurality of gem dithioether linkages with water in the presence of a catalytically effective amount of strong nonoxidizing acid such as those disclosed in U.S. Pat. No. 3,413,265, and other polythiol polymers such as those described in U.S. Ser. No. 484,118, filed Aug. 31, 1965, now abandoned, in the name of G. F. Bulbenko and L. Citarel; U.S. Pat. No. 3,446,780; and U.S. Pat. No. 3,446,775.

The —SH containing polymers, according to the present invention, may be used singly or in various combinations with each other. The curable liquid polysulfide polymer compositions usually contain about 20 to 60 percent by weight of such polymers.

Among the commercially available liquid polysulfide polymers, the THIOKOL LP polymers are especially preferred. Of these, LP-31 and LP-32 liquid polysulfide polymers are especially preferred because of their adhesiveness and resiliency in cured form. LP-31 is a high molecular weight liquid polysulfide polymer which contains reactive thiol terminals which may be cured in place at room temperatures to form hard rubbers. Its structure may be represented by the formula:

The uncured polymer has an average molecular weight of about 7,500 and a viscosity at 25°C. of 800–1,400 poises. LP-32 is a low molecular weight liquid polysulfide polymer whose structure may be represented by the formula:

The uncured polymer has about 0.5 percent cross-linking and an average molecular weight of about 4,000. It has a viscosity at 25°C. of 350–450 poises. LP-31 resembles LP-32 in that each has a relatively low proportion of branched chains in its structure. While LP-31 and LP-32 liquid polysulfide polymers as commercially provided usually have average molecular weights of 7,500 and 4,000 respectively, they can be manufactured to molecular weights as high as 14,000.

When a low molecular weight thiol terminated polymer like LP-32 or LP-31 is used to practice the invention, it must be partially cured, as discussed above, to increase its molecular weight and viscosity for compounding purposes. In general, the low molecular weight liquid polymer is blended with sufficient curing agent, e.g. an organic peroxide such as tertiary butyl hydroperoxide, or any of the curing agents described below for curing thiol terminated liquid polymers, to semicure the polymer to a molecular weight in the desired range of about 15,000 to 25,000 and the corresponding viscosity at 25°C. in the range of about 6,000 to 70,000 poises. For example, 100 parts of LP-31 having a molecular weight of 7,500 are blended with 0.6 parts of tertiary butyl hydroperoxide and 0.5 parts by weight of triethylamine and mixed for about 1 hour in a Baker-Perkins mixer at low (5–10 psig) pressure steam temperature, thereby raising the molecular weight to about 16,000 and the viscosity at 25°C. to about 8,000 poises. Low molecular weight polymer, e.g. LP-31 or LP-32, may also be blended with a sufficient amount of an organic polysulfide rubber, preferably THIOKOL ST polysulfide rubber, referred to hereinafter as ST polysulfide rubber, to prepare a polymer blend having the desired ranges of molecular weight and viscosity.

When LP-31 or LP-32 liquid polysulfide polymer is used to prepare a polymer blend with ST polysulfide rubber, the polymers interact to reduce the viscosity of the rubber so that the mixture can be readily processed and and provide a sufficient number of thiol terminals to render the blended composition adequately adhesive to a primed substrate of glass or metal.

ST polysulfide rubber is a millable gum elastomer prepared from bis(2-chloroethyl) formal and sodium polysulfide. Vulcanizates exhibit outstanding resistance to a broad spectrum of oils and solvents, to gas permeability, low temperature, ozone and weathering. A description of the manufacturing process for ST polysulfide rubber is presented in Volume 41, No. 1 Feb. 1968), of rubber chemistry and technology, p. 114, E. R. Bertozzi.

Briefly, sodium polysulfide is prepared by reacting sodium hydroxide with sulfur at elevated temperatures. This is a stepwise reaction yielding sodium thiosulfate as a by-product. The second monomer, bis(2-chloroethyl) formal, is produced from ethylene chlorohydrin and formaldehyde. Then, the two monomers are reacted together, along with 2 percent of a branch inducing agent, 1, 2, 3-trichloropropane.

The resulting polymer is chemically reduced to yield a mercaptan terminated polymer of approximately 80,000 molecular weight with a structure as follows:

$$HS-R-S-(S-R-S)_nS-R-SH$$

where $n$ is equal to about 500,

R represents a random mixture, 98 percent of which has the structure and 2 percent has the trifunctional structure The latter groups supply branching sites which are randomly positioned in the polymeric chains and branches. All the —SH groups are at the ends of chains and branches. The Mooney viscosity (ML 1 + 3 at 212°F.) is 27–35.

Blends of ST polysulfide rubber with LP–31 and LP–32 liquid polysulfide polymers are readily prepared by mixing the ST polyfulfide rubber and liquid polysulfide polymer in a blender and then heating the blend at 158°F. under a dry nitrogen atmosphere until a constant Mooney viscosity is attained. This may take about 1 week. The amounts of each polymer to use to make a polymer blend desired to have a particular molecular weight and viscosity may be readily calculated from the molecular weights of the respective polymers. Typical sets of polymer blend formulations are shown in Examples 1 and 2.

EXAMPLE I

Blends of ST polysulfide rubber with LP–31 liquid polysulfide polymer.

BLEND NUMBER

|  | 1 | 2 | 3 | 4 | 5 |
|---|---|---|---|---|---|
| ST, p.b.w. | 16.8 | 22 | 55 | 69 | 73.6 |
| LP–31, p.b.w. | 83.2 | 78 | 45 | 31 | 26.4 |
| Mol. Wt. (a) | 8,990 | 10,920 | 15,000 | 20,000 | 25,000 |
| Viscosity, Poises at 25° C. | 1,650 | 2,500 | 6,200 | 21,000 | 68,000 | p.b.n. = parts by weight
(a) Calculated on basis of 80,000 mol. wt. for ST polysulfide rubber and 7,500 mol. wt. for LP–31 liquid polysulfide polymer.

EXAMPLE II

Blends of ST polysulfide rubber with LP–32 liquid polysulfide polymer.

BLEND NUMBER

|  | 1 | 2 | 3 | 4 | 5 | 6 |
|---|---|---|---|---|---|---|
| ST, p.b.w. | 57.1 | 60 | 66.7 | 75.5 | 84.3 | 88.6 |
| LP–32, p.b.w. | 42.9 | 40 | 33.3 | 24.5 | 15.7 | 11.4 |
| Mol Wt. (a) | 8,990 | 9,350 | 10,920 | 15,000 | 20,000 | 25,000 |
| Viscosity, Poises at 25° C. | 1,650 | 1,800 | 2,500 | 6,200 | 21,000 | 68,000 |

(a) Calculated on basis of 80,000 mol. wt. for ST polysulfide rubber and 4,000 mol. wt. for LP–32 liquid polysulfide polymer.

The semi-cured, curable sealing strip compositions, from which the sealing strips are shaped, when compounded will contain from about 2 to 20 parts by weight of at least one curing agent for the semi-cured liquid polymer per 100 parts by weight of such polymer in the compositions. The curing agent may be any of the agents known in the polysulfide polymer curing art which, when activated, will cause the semi-cured polymer to cure to a final cure state within a sufficiently rapid curing time, e.g. within a few hours to about a week. Typical curing agents include inorganic peroxides, organic peroxides, and other inorganic and organic oxidizing agents. The inorganic peroxides include alkaline earth metal peroxides and peroxides of other metals, antimony sodium peroxide, lithium peroxide, lead peroxide, manganese peroxide, antimone peroxide, and sodium carbonate peroxide. Other inorganic oxidizing agents include chromate salts disclosed in U.S. Pat. No. 2,787,608, manganates, plumbates, permanganates and molybdates. Among the inorganic peroxides, calcium peroxide is preferred. Organic peroxides include benzoyl peroxide, dicumyl peroxide and cumene hydroperoxide. Among the organic peroxides, tertiary butyl hydroperoxide is preferred.

The curing agents may be used alone or in combinations. The amounts and types of curing agents used will depend upon the particular polythiol-terminated polymer or polymers being used, the amounts and types of extenders and fillers used, and the particular rheological properties desired in the semi-cured, curable sealing strip and in the cured sealing strip.

Compounds usually used as plasticizers may be and preferably will be used as extenders in the semi-cured, curable sealing strip composition, and in some cases also will serve as desiccating and hygroscopic accelerating agents. Such plasticizers include chlorinated hydrocarbons, e.g. chlorinated biphenyls; phthalates, e.g. dibutyl phthalate, butyl benzyl phthalate; and polyalkylene glycol benzoates, e.g. polyethylene glycol dibenzoate. About 0 to 300 parts by weight of the extender plasticizers may be used per 100 parts by weight of the semi-cured polymer.

The thiol-terminated polymer based sealing strip compositions used in the practice of the present invention may also contain various types of materials commonly employed in the liquid polysulfide polymer compounding art, including fibrous fillers; pigments; fatty acid cure inhibitors, such as stearic acid; and non-fibrous fillers, or reinforcing agents, such as carbon black, clays, slate flour, limestone, calcium carbonate, asbestine, aluminum oxide, titanium dioxide, zinc sulfide, silicon dioxide, magnesium silicate, iron oxide. The fibrous fillers preferably are synthetic fibers, particularly Dacron, nylon or rayon in floc, tow or staple form. In general, the use of these materials tends to decrease the elongation and to increase the Shore hardness, toughness and tensile strength of the cured polymer system. About 0 to 500 parts by weight of such materials may be used per 100 parts by weight of semi-cured polythiol-terminated polymer.

Fibrous fillers are especially advantageous for practice of the invention. Dacron fibers having deniers of from about 1 to 5 and lengths of from about one sixty-fourth inch to about 1/2 inch are especially preferred. Asbestos fibers also are preferred, provided, however, that they are of low alkaline reactivity. High alkalinity is undesirable both in the fibers and in the other ingredients added to the polythiol-terminated polymer because of its tendency to cause undesirable surface curing of the polymer in the stored sealing strip. Chopped fibrous glass filaments also are advantageous as fillers.

Adhesive additives also may be present in the sealing strip compositions in amounts of about 0.1 to 20 parts by weight per 100 parts of the semi-cured polythiol-terminated polymer. Examples of the adhesive additives used in the compositions employed in the practice of the invention include polyurethane resins, e.g. SOLITHANE 291 resin with 3.20 percent NCO; isocyanates, e.g. diphenylmethane-4,4'-diisocyanate; chlorinated terphenyls; phenolic resins, e.g. phenol-formaldehyde and allyl ethers of mono-, di- and trimethylol phenols; epoxy resins, e.g. epichlorohydrin bisphenol A; organosilicon compounds, e.g. gamma-glycidoxypropyltrimethyoxysilane and mercaptopropyltrimethoxysilane; acrylic resins, e.g. polybutyl acrylate; polyester resins, e.g. hydrogenated rosin esters of glycerol and ethylene glycol; polyamides, e.g. VERSAMID resins which are condensation products of a dimeric fatty acid with a polyamine; and liquid polysulfide polymers other than the principal polythiol-terminated polymer itself. In some embodiments of the invention wherein LP–31 or LP–32 is used as the liquid polysulfide polymer, it will also be advantageous to include with or substitute for the ST type organic polysulfide rubber another synthetic rubber or polymeric resin from the following group, which includes chlorinated rubbers; acrylic resins; polyisobutylene, reclaimed natural and synthetic rubbers, e.g. butadiene-styrene type rubbers such as SBR; epoxy resins; chlorinated biphenyls; coumarone-indene resins and polyamides.

Other adhesive additives than those described above may be used in practice of the invention, provided that they are compatible with the other ingredients in the uncured and cured liquid polythiol-terminated polymer composition, and the surfaces to which the semi-cured, curable sealing strip is applied.

Other additives may be used in the semi-cured, curable sealing strip composition for particular applications and include, for example, thixotropic agents, such as hydrated calcium silicate, and anti-oxidants, e.g. butylated hydroxy toluene.

Advantageous ultraviolet light stabilizers are organic silicon-containing compounds substituted with at least one alkoxy, acyloxy, vinyl or amino group, e.g. aminopropyl triethoxy silane as taught in U.S. Pat. No. 3,123,495 or a mercapto alkyl polyalkoxy silane as taught in U.S. Pat. No. 3,312,669, or a B-mercaptoalkylamino-alkyl polyalkoxy silane as taught in U.S. Pats. Nos. 3,297,473 and 3,328,451. Also effective are benzophenones, e.g. 4-dodecyloxy-2-hydroxybenzo phenone, benzotriazoles, aryl esters and substituted acrylonitriles. From 1 to 5 parts of ultraviolet light stabilizer per 100 parts by weight of the semi-cured thiol terminated liquid polymer usually will be adequate for the windshield use of the sealing strip.

The relative amounts of curing agent and other ingredients admixed with the semi-cured polythiol-terminated polymer may be varied substantially depending upon the molecular weight and/or chemical structure of the polymer. Generally, however, it is desirable that the curing agent be present in at least stoichiometric amounts relative to the semi-cured polythiol-terminated polymer in order to provide a complete cure of the sealing strip in its use on a windshield.

The semi-cured, curable sealing strip composition when compounded for extrusion will comprise a formulation with about the following ranges of ingredients:

| | p.b.w. |
|---|---|
| Liquid polythiol-terminated polymer | 100 |
| Extender-plasticizer | 0 to 100 |
| Precipitated CaCO$_3$ | 0 to 300 |
| Dry ground limestone | 0 to 300 |
| Fibrous filler | 2 to 50 |
| Carbon black | 2 to 75 |
| Curing agent for semi-curing | 0 to 7 |
| Curing agent for final curing | 1 to 20 |
| Adhesive additive | 0 to 20 |
| Desiccant | 1 to 20 |
| Ultraviolet light stabilizer | 1 to 5 |

The semi-cured liquid polythiol polymer and the other ingredients of the semi-cured, curable sealing strip composition are blended together substantially as described above and more completely described in the examples which follow. The semi-cured, curable sealing strip composition is then extruded into a tape form having appropriate cross-sectional dimensions, e.g. from about one-fourth inch × one-fourth inch to about one-half inch × one inch. The resulting tape is the semicured, curable sealing strip used to seal and adhere an automobile windshield to its retaining frame on an automobile body.

For practical purposes, the curable sealing strip, as it leaves the extruder die, is deposited in a known way onto a slip sheet or peel strip and is immediately rolled into conveniently sized rolls of a desired length. The rolls are then placed in hermetically sealed containers which are kept sealed until shortly before the time the sealing strips are to be used. Suitable peel strip materials include plastic films which are inert to the sealing strip composition ingredients and detachably adhesive to the surface of the strip and may be, e.g. polypropylene or polyethylene films, tapes, synthetic resin treated papers or cloths, and the like.

Typical rheological properties of the extruded semi-cured, curable sealing strip made according to the above formulation and having cross-section dimensions of one-half inch × one-half inch will be about as follows:

A. Yield strength, p.s.i. to cohesive failure
at 1 inch/minute crosshead speed:

| Initial, green strength at 75° F. at | |
|---|---|
| 50% humidity | 5 to 30 |
| 24 hours at 100° F. at 100% humidity | 5 to 80 |
| 7 days at 190° F. | 15 to 300 |
| 7 days at 100° F. at 100% humidity | 5 to 300 |
| 7 days at 75° F. under ultraviolet light | 5 to 80 |

B. Peel strength, lb./inch at 6 inch/minute 180° peel:

| | |
|---|---|
| Outdoor exposure, 6 days | 5 to 80 |
| Outdoor exposure, 12 days | 5 to 100 |
| Weatherometer, 16 hours | 30 to 120 |
| Weatherometer, 120 hours | 50 to 120 |

C. Physical properties measured after 3 days curing of semi-cured curable sealing strip at 100°F. and 100 percent relative humidity and after molding at 310°F. for 10 minutes will be about as follows, using the usual ASTM test procedures:

| | |
|---|---|
| Hardness, Shore A | 30 to 60 |
| Tensile, p.s.i. | 100 to 600 |
| Modulus, 100% | 40 to 250 |
| Modulus, 200% | 70 to 350 |
| Elongation, % | 200 to 700 |
| Tear, lb./inch | 30 to 100 |

D. The package stability of the semi-cured, curable sealing strip when stored under less than about 5 percent relative humidity conditions at room temperature of about 75°F., depending upon the formulation, will be at least several months.

The use of the semi-cured, curable sealing strip for sealing and adhering a windshield to the windshield frame of an automobile body may be understood by reference to the drawing. At time of use, the semi-cured, curable sealing strip 1 is removed from its container and is unrolled to a length slightly longer than the periphery 3 of the windshield 2 to which it is to be adhered. One end of the sealing strip 1 is adhered to the windshield inner surface at the edge of the glass held in a windshield-holding jig (not shown) and the slip sheet (not shown) is removed as the sealing strip 1 is pressed into contact with the glass along the periphery of the windshield 2. When the periphery 3 has been covered with the sealing strip 1, the excess of the strip 1 is trimmed to make a butt joint 5 with the beginning end of the strip. The windshield 2 and the adhered sealing strip 1 are then placed in position on the previously cleaned metal windshield receptacle 6, or frame, of the automobile body 1. The windshield 2 is pressed into place by means of an air pressure actuated windshield press (not shown) which applies equal compressive forces at all parts of the windshield 2 and windshield receptacle 6 in contact with the sealing strip 1. The pressure applied must be sufficient to cause the semi-cured, curable sealing strip 1 composition to flow into complete sealing and adhesive contact with the metal of the windshield receptacle 6, thereby sealing both the surface of the metal receptacle 6 and the surface of the glass 1 against passage of liquids. The sealing strip 1 is preferably extruded to have recessed sides 8—8 to aid in compressing of the strip 1. The pressure may be released as soon as adhesion has taken place. This will usually require less than a minute of time. The windshield is functionally ready for use. Curing of the semi-cured curable sealing strip composition will then proceed to a final cure state which will be reached in about 60 to 120 days, depending on the humidity and temperature to which the automobile is exposed.

Figure 1:
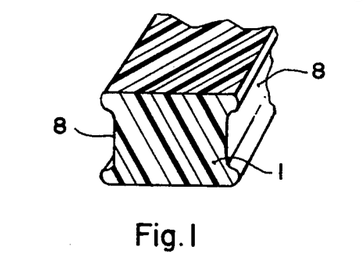
FIG. 1 is an isometric end view of an extruded semi-cured, curable sealing strip.
Figures 2, 3, 4:
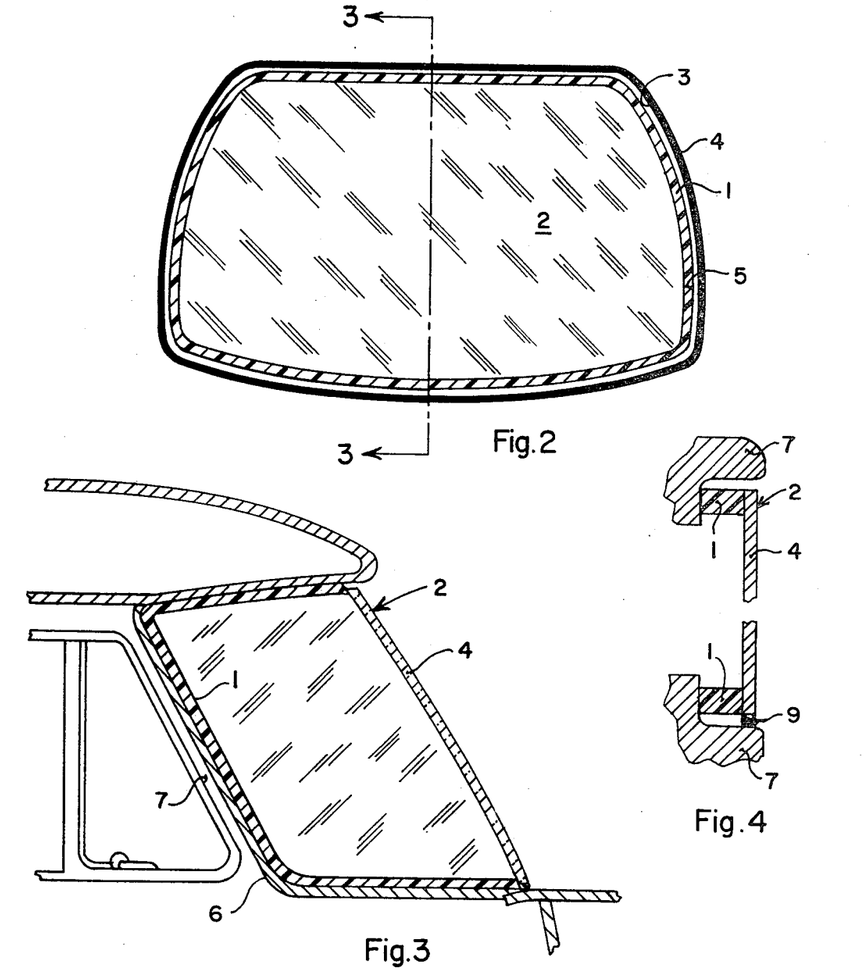
FIG. 2 shows the semi-cured, curable sealing strip after it has been applied to the inner face of an automobile windshield.
FIG. 3 is a view taken along the line 3—3 of FIG. 2 of the windshield after the windshield has been mounted into the windshield frame of an automobile body.
FIG. 4 is a vertical sectional view taken along the center of the windshield in FIG. 3.

It will be understood that the semi-cured, curable sealing strip 1 can also be applied directly to the previously cleaned metal windshield receptacle 6 and the windshield 2 can then be pressed into place by the windshield press as described above. In the latter method of mounting of the windshield 2 into the receptacle 6, it will be advantageous to place a number of resilient edge supports 9 as shown in FIG. 4 along the bottom edge of the receptacle 6 to protect the edge of the glass from contact with the metal.

The compressed semi-cured, curable sealing strip adsorbs sufficient moisture from a room having about 50–75 percent relative humidity at about 70°–80°F. to cure to an initial cure set within hours. The windshield of the automobile may, however, by subjected substantially after mounting to exposure to water without leakage occurring and to usual driving conditions without becoming dislodged, with the sealing strip continuing to cure to its core to a final cured state. Ornamental trim pieces also can be attached to the automobile body immediately upon removal of the windshield press and jig.

When finally cured, the sealing strip composition forms an elastomeric composition which has a Shore A hardness of from about 30 to 80, and preferably from about 35 to about 70. The Shore A hardness can be controlled by the selection of ingredients and curing agents as described above.

With some formulations which may be used, it will be advantageous to use adhesion primers on the glass and the metal surfaces to which the semi-cured, curable sealing strip is to be applied. When a primer is to be used, the primer composition solution preferably comprises (a) at least one adhesive material compatible with the semi-cured, curable sealing strip composition and with the metal or painted finish on the metal frame 6 of the automobile body, (b) a mixture of organic solvents for the adhesive material, which mixture may also contain a solvent which activates the adhesive of the sealing strip composition if one is present, and (c) an extender. Fillers, and preferably, a drying agent and other ingredients may also be added to impart color, strength and tack or body to the adhesive composition.

The adhesive material in the primer composition solution may be the same adhesive material as an adhesive used as an additive in preparing the semi-cured, curable sealing strip composition, as discussed above. Preferably, the adhesive material is at least one material selected from chlorinated natural rubbers, polyurethanes, a mixture of allyl ethers of mono-, di-and trimethylol phenols, acrylic esters, gamma-glycidoxypropyltrimethoxysilane, and silicones.

The solvents used are organic solvents and include, for example, aromatic hydrocarbons, e.g. toluene and xylene; ketones, e.g. acetone, methyl ethyl ketone, methyl isobutyl ketone, and cyclohexanone; halogenated hydrocarbons, e.g. methylene chloride, 1,1,1-trichloroethane, and 1,1,2-trichloro-1,1,2-trifluoroethane; chlorinated bephenyls; esters, e.g. butyl acetate, and butyl cellosolve acetate; alcohols, e.g. methyl alcohol, ethyl alcohol and furfuryl alcohol; and aliphatic hydrocarbons, e.g. hexane, heptane and octane The solvents used are, preferably, a mixture of an aromatic hydrocarbon, e.g. toluene, and an aliphatic ketone, e.g. methyl ethyl ketone. Other compatible, volatile solvent mixtures may also be used and their selection will be known to those skilled in the adhesives art.

The primer composition solution ingredients are mixed together in a known manner to form a solution comprising, per 100 parts total by weight, from about 20 to 40 parts of adhesive additives materials, from about 59 to about 79 parts of solvent materials, and other ingredients, e.g. extenders and fillers, to bring the total weight to 100 parts. Sufficient solvent is used to make a quick-drying, readily brushable, rollerable or sprayable adhesive composition, as desired, for a particular type of applicator means. The primer composition solution is applied to the glass and metal surfaces in a known way.

In some cases, particularly if the sealing strip has become exposed to moisture during storage and has begun to form a skin on the outer surfaces, it will be advantageous to reactivate the sealing strip to an adhesive condition by means of the adhesive primer composition solution.

The amount of primer composition solution to use on the sealing strip composition can readily be determined by a few trial runs. Sufficient solution should be used to permit the solvents therein to activate at least the outer surface layer of the sealing strip composition to a tackified surface. However, deeper activation is more advantageous and is preferred. The amount of solvent and its type are selected accordingly. The primer composition solution is applied directly to the exposed surface of the sealing strip composition. The primer composition solution ingredients activate the surface of the sealing strip composition, causing it to swell or bloom somewhat. The activation of the surface of the sealing strip composition is rapid and takes place in a period of time of from a few seconds to several minutes. The major portion of the solvents of the primer composition are, for the most part, rapidly evaporated from the treated elastomer surface in about 1 to 2 minutes at room temperature, converting the primer-treated sealing strip composition surface to a tackified state. The reactivated sealing strip is then ready for application to the windshield 2 and to the automobile windshield receptacle 6.

The invention is further illustrated by the following examples of preferred embodiments.

EXAMPLE III

Preparation of Semi-Cured Curable Sealing Strip with LP–31

A semi-cured sealing strip composition based on Thiokol LP–31 liquid polysulfide polymer having an initial average molecular weight of about 10,000 and a viscosity at 25°C. of about 2,000 poises is compounded as follows (all parts are by weight).

One hundred parts of LP–31 are mixed to a semi-cured state under essentially dry conditions (less than 3 percent humidity) with 0.5 parts of an initiator consisting of a 1 percent solution of cupric abietate in Aroclor 1254 and 1.5 parts of 70 percent tertiary butyl hydroperoxide (curing agent) for 1 hour in a Baker-Perkins mixer heated by low steam pressure (e.g. 12 psig). At the end of this time, the reaction is terminated. Next 10 parts of a 5:3 mixture of BaO (desiccant) in Santicizer 160 (butyl benzyl phthalate plasticizer) are blended into the ingredients in the mixer for about 0.5 hour. Then there are added 23 parts of Aroclor 1254 (chlorinated biphenyl, extender), 70 parts of carbon black, 2.5 parts of Dacron * (*Dacron is a trademark of E.I. du Pont deNemours & Co., Inc. for a manufactured fiber in which the fiber-forming substance is a long chain synthetic polymer composed of at least 85 percent by weight of an ester of dihydric alcohol and terephthalic acid (p—HOOC—$C_6H_4$—COOH—).) polyester fibers 54W (staple, 1.5 denier, one quarter-inch length), and 2 parts of amino propyl triethoxy silane (ultraviolet light stabilizer and adhesive). Mixing is continued for another 0.5 hour. Then, 10 parts of a 12:25 mixture of $CaO_2$ (Becco 60 percent) in Aroclor 1254 are dispersed into the mixture. After sufficient mix to ensure complete dispersal of the $CaO_2$, the resulting batch of semi-cured curable sealing strip composition is discharged into an extruder and is extruded through a die head having a one-half inch × one-half inch cross section. The extruded sealing strip is deposited upon a polyethylene film which serves as a peel strip. The semi-cured, curable sealing strip then may be rolled up and stored under moisture-free conditions, or it may be immediately used as an adhesive, semi-cured curable sealing strip for mounting and sealing a windshield on an automobile.

EXAMPLES IV & V

Preparation of Adhesive Curable Sealing Strip with LP–ST Blends

A. Components

| Blend: | Parts by Weight | |
|---|---|---|
| | LP–31–ST | LP–32–ST |
| Ingredients | | |
| LP–31, m.w. 7500 | 45 | — |
| LP–32, m.w. 4000 | — | 24.5 |
| ST, m.w. 80,000 | 55 | 75.5 |
| Asbestos fibers 5KOR | 25 | 25 |
| Multifex MM (1) | 20 | 20 |
| Sterling MT (2) | 50 | 50 |
| Aroclor 1254 (3) | 35 | 35 |
| CaO/Aroclor 1254 Paste (4) | 11 | 11 |
| $CaO_2$/Aroclor 1254 Paste (5) | 12.5 | 12.5 |

(1) Precipitated $CaCO_3$
(2) Carbon black
(3) Chlorinated biphenyl
(4) 1:1 by weight, milled to N.S. fineness greater than 6.
(5) 2:3 by weight, milled to N.S. fineness greater than 6.

B. Mixing Procedure

The ST polysulfide rubber is shredded into the LP-31 or LP-32 liquid polysulfide polymer and heated to about 158°F. and stirred and held at that temperature until a constant viscosity of about 6,200–6,500 is reached (about 7 days). This viscosity corresponds to an average molecular weight of about 15,000–16,000. 100 parts of of the LP-ST blend is placed in a Baker-Perkins type blender. The CaO/Aroclor 1254 paste is then added as a desiccant and mixed under moisture-free conditions. The asbestos fibers, Multifex MM, Sterling MT and Aroclor 1254 are then added and mixed until homogenously blended into the mass.

Care must be taken to exclude moisture. All mixing should be done at less than 3 percent humidity. (An ultraviolet light stabilizer and adhesive, e.g. Silane A-1100 of Union Carbide Corp. (Gamma-amino-propyltriethyloxy silane) may be added at this time, but was not incorporated into the compositions used in these examples). The $CaO_2$/Aroclor curing agent paste is then blended into the mass. The mass is then extruded through a die having one-half inch × one half inch crosshead dimensions.

C. Characteristics of Sealing Strip

Test pieces of sealing strips were made by cutting the extruded sealing strip to one-half inch × one-half inch × 2 inch lengths. The strips were placed on a primed glass plate and covered with a steel plate finished with acrylic automotive metal finish and treated with primer. Each plate measured about one-quarter inch × 1 inch × 3 inches. The primer used on the glass was a solution consisting of 1 percent Y-5254 (amino-alkyl silicone coupling material in combination with other chemicals, Union Carbide Company) in methanol. The primer used on the automotive finish was an organic solvent solution consisting of chlorinated rubber, Aroclor 1264, Mondur CB (urethane prepolymer, 60 percent solids), toluene, methylethyl ketone, trimethyl orthoformate and carbon black. The sealing strip was compressed between the sheets to one-eighth inch thickness and held compressed for 1 minute. The pressure was then released and the strip was conditioned for 24 hours at 75°F./50 percent relative humidity. The physical characteristics were then determined and compared with standards set by major automobile manufacturers for windshield sealing strip. The following data were obtained:

| Yield Strength | Blend LP-31-ST | LP-32-ST |
|---|---|---|
| 100% Cohesive failure, 1 inch/min. crosshead speed | | |
| After 24 hours at 75° F./50% rel. hum., p.s.i. | 9.5 | 11 |
| After 24 hours at 100° F./100% rel. hum., p.s.i. | 20.9 | 20 |
| After 1 week at 100° F./100% rel. hum., psi | 35 | 39 |
| Physical Properties After curing 4 days at 100° F./100% Rel. Hum., and pressout at 300° F. | | |
| Hardness, Shore A | 66 | 63 |
| Tensile, p.s.i. | 332 | 340 |
| Tensile Modulus | | |
| 100%, p.s.i. | 250 | 220 |
| 200%, p.s.i. | 320 | 300 |
| Elongation, % | 210 | 260 |
| Tear, Die C, lb./in. | 71 | 68 |

EXAMPLES VI-X

Preparation of Adhesive, Curable Sealing Strip with High Molecular Weight (13,000–15,000 mol. wt.) Liquid Polysulfide Polymer A liquid polysulfide polymer similar to LP-31, but having a molecular weight of about 13,000 to 15,000, was prepared by the procedures of Patrick U.S. Pat. No. 2,466,963 mentioned above, particularly by reacting dichloro diethyl formal with sodium polysulfide and using one-half mole percent of trichloropropane as a cross-linking agent. This polymer is referred to as "liquid polysulfide polymer A" in the following examples.

A. Components

| Ingredients | EXAMPLE NO Parts by Weight | | | | |
|---|---|---|---|---|---|
| | VI | VII | VIII | IX | X |
| Liquid Polysulfide Polymer A | 100 | 100 | 100 | 100 | 100 |
| Sterling MT | 50 | 5 | — | 50 | 5 |
| Sterling R | 20 | 70 | 67 | 20 | 70 |
| Asbestos 5KOR | 25 | — | — | 25 | — |
| Multifex MM | 20 | — | — | 20 | — |
| Aroclor 1254 | 32 | 34 | 37 | — | 34 |
| CaO/Aroclor 1254, 1:1 ratio | 11 | 11 | 11 | 11 | 11 |
| $Ca_2PbO4$/Aroclor 1254, 1:1 ratio | 16 | — | — | — | — |
| $CaO_2$/Aroclor 1254, 1:1 ratio | — | — | 7 | 12.5 | 10 |
| Glacial acetic acid | 1 | — | — | — | — |
| Aplex No. 33 (1) | — | 65 | — | — | — |
| Aplex No. 32 (1) | — | — | — | — | 65 |
| Tertiary butyl perbenzoate, 98% | — | 3 | — | — | — |
| Witcarb RC (2) | — | — | 30 | — | — |
| HiSil 233 (3) | — | — | 20 | — | — |
| Dacron Polyester 54W | — | — | 3 | — | — |
| Triethylamine | — | — | — | 0.5 | — |
| Epoxy silane (4) | 2 | 2 | 2 | 2 | 2 |

(1) Asbestos
(2) Precipitated $CaCO_3$
(3) Hydrated silica, desiccant
(4) Gamma-amino propyltriethyloxy silane or equivalent, ultraviolet light stabilizer and adhesive tackifier.

B. Mixing Procedure

The mixing procedure for preparing the compositions of Examples VI-X is the same as described in connection with Example III.

C. Characteristics of Sealing Strips

Test pieces were prepared and tested in accordance with the procedure described in connection with Examples IV and V. The test results obtained are shown in Tables I and II. It is seen that the data fall well above the minimum typical rheological properties described above and used as the standard desired properties.

TABLE 1

| Yield Strength | EXAMPLE NO | | | | |
|---|---|---|---|---|---|
| | VI | VII | VIII | IX | X |
| 100% Cohesive failure, 1 inch/min. crosshead speed | | | | | |
| After 24 hours at 75° F./50% rel. hum., psi | 6.3 | 7 | 11 | 10.8 | 7.3 |
| After 24 hours at 100° F./100% rel. hum., psi | 22 | 16 | 16 | 26 | 15.5 |
| After 1 week at 100° F./100% rel. hum., p.s.i. | 35 | 39 | — | 55 | — |
| 190° F./100% rel. hum. | — | — | — | 38 | — |
| After 1 week under ultraviolet light | — | — | — | 25 | — |
| Physical Properties After curing 4 days at 100° F./100% R.H. and pressout at 300° F.: | | | | | |
| Hardness, Shore A | 72 | — | — | 63 | 67 |
| Tensile, psi | 466 | — | — | 373 | 306 |
| Tensile, Modulus | | | | | |
| 100%, p.s.i. | 275 | — | — | 223 | 249 |
| 200%, p.s.i. | 378 | — | — | 332 | 276 |
| Elongation, % | 313 | — | — | 260 | 276 |
| Tear, Die C, lb./in. | 107 | — | — | 79 | — |

TABLE II

| Cured Adhesive Strength, lb./in. at 6 inches/minute at 180° peel | Ex. IX |
|---|---|
| 16 hours in Weatherometer | 46 (cohesive failure) |
| 6 days outdoor exposure | 52 (cohesive failure) |
| 12 days outdoor exposure | 5 (cohesive failure) |
| (Both at Trenton, N.J. during Winter-Spring) | 7 (cohesive failure) |

EXAMPLE XI

Sealing strip prepared according to the procedure described in Example III was tested in accordance with the procedures described in connection with Examples IV and V. The results obtained were as follows:

| | |
|---|---|
| Initial hardness, semi-cured, Shore A | 8 |
| Yield Strength | p.s.i. |
| After 10 days at 75° F./50% rel. hum., psi | 11.9 |
| After 14 days at 190° F. | 22 |
| After 500 hours at 100° F./100% rel. hum. | 32 |
| After 500 hours exposure to ultraviolet light | 16 |

Physical Properties
After curing 3 days at 100° F./100% rel. hum. plus 10 minutes at 285° F.

| | |
|---|---|
| Hardness, Shore A | 54 |
| Tensile | 337 p.s.i. |
| Modulus, 100% | 128 p.s.i. |
| Modulus, 200% | 167 p.s.i. |
| Modulus, 300% | 208 p.s.i. |
| Elongation, % | 640 |
| Tear, Die C, lbs./in. | 78 |

EXAMPLE XII

Preparation of Semi-Cured Curable Sealing Strip From LP-ST Blends According to Example III LP-31-ST and LP-32-ST blends having viscosities below 6,200, e.g. blends 1 and 2 of Example I and blends 1, 2 and 3 of Example II, can be semi-cured to form a liquid poly-thiol terminated polymer having the desired viscosity of 6,000 or higher and a sealing strip composition based thereon by following the procedures described in connection with Example III.

While the adhesive, semi-cured, curable sealing strip product of the invention has been described in its use as a mounting and sealing strip for a windshield on an automobile, it will be understood that it may also be used for mounting and sealing the rear window of the automobile and that it will also be useful for other applications in a sealed structure whether in other vehicles for land, sea or air uses or in the architectual field, e.g. for thermopanes, where the adhesive sealing strip may be quickly applied in its curable condition and cured after its installation.

We claim:

1. In a sealed structure having a glass article mounted and sealed to a metal substrate by means of an intervening shaped sealing means the improvement comprising an adhesive semi-cured sealing strip formed from a composition comprising the following ingredients in the following parts by weight:

| | |
|---|---|
| Liquid polythiol-terminated polymer | 100 |
| Extender-plasticizer | 0 to 100 |
| Precipitated CaCO₃ | 0 to 300 |
| Dry ground limestone | 0 to 300 |
| Fibrous filler | 2 to 50 |
| Carbon black | 2 to 75 |
| Curing agent for semi-curing | 1 to 7 |
| Curing agent for final curing | 1 to 20 |
| Adhesive additive | 0 to 20 |
| Desiccant | 0 to 20 |
| Ultraviolet light stabilizer | 1 to 5 | said liquid polythiol-terminated polymer after semi-curing having a viscosity at 25°C. in the range of from about 6,000 to 70,000 poises and having a molecular weight of from about 13,000 to about 25,000.

2. A sealed structure as in claim 1 wherein the liquid polythiol-terminated polymer in the composition is a liquid polysulfide polymer represented by the formula $$HS(C_2H_4-OCH_2-O-C_2H_4-SS)_{42}-C_2H_4-OCH_2-O-C_2H_4SH.$$

3. A sealed structure as in claim 1 wherein the liquid polythiol-terminated polymer in the composition is a liquid polysulfide polymer represented by the formula $$HS(C_2H_4-OCH_2-O-C_2H_4-SS)_{23}-C_2H_4-OCH_2-O-C_2H_4SH.$$

4. A sealed structure as in claim 1 wherein the liquid polythiol-terminated polymer in the composition consists essentially of liquid polysulfide polymer having a molecular weight of from about 13,000 to about 15,000 and prepared by reacting dichloro diethyl formal with sodium polysulfide and using one-half mole percent of trichloropropane as a cross-linking agent.

5. A sealed structure as in claim 1 wherein the fibrous filler in the composition is selected from nylon, polyester, rayon, asbestos and glass fibers.

6. The sealed structure as in claim 1 wherein the liquid polythiol-terminated polymer is semi-cured by heating said polymer in the presence of semi-curing curing agents.

7. In a process for mounting and sealing glass windshield on an automobile body having a windshield receiving means which comprises a. priming the windshield receiving means with a primer solution for a coated metal surface, b. priming the periphery of the glass windshield on its inside facing surface with a primer solution for a glass surface, c. positioning and adhering a shaped semi-cured sealing strip based on a composition comprising the following ingredients in the following parts by weight:

| | |
|---|---|
| Liquid polythiol-terminated polymer | 100 |
| Extender-plasticizer | 0 to 100 |
| Precipitated CaCO₃ | 0 to 300 |
| Dry ground limestone | 0 to 300 |
| Fibrous filler | 2 to 50 |
| Carbon black | 2 to 75 |
| Curing agent for semi-curing | 1 to 7 |
| Curing agent for final curing | 1 to 20 |
| Adhesive additive | 0 to 20 |
| Desiccant | 0 to 20 |
| Ultraviolet light stabilizer | 1 to 5 | said liquid polythiol terminated polymer after semi-curing having a viscosity at 25°C. in the range from about 6,000 to 70,000 poises and having a molecular weight of from about 13,000 to about 25,000 between said primed surfaces, d. and compressing said windshield and shaped semi-cured sealing strip against said windshield receiving means and automobile body, the improvement which comprieses using the semi-cured sealing strip substantially as an immediately functional sealing strip and windshield mount which continues to cure to a cured state after being adhered and compressed between said windshield and automobile body.

8. The process of claim 7 wherein the liquid polythiol-terminated polymer is a liquid polysulfide polymer represented by the formula $$HS(C_2H_4-OCH_2-O-C_2H_4-SS)_{42}-C_2H_4-OCH_2-O-C_2H_4SH.$$

9. The process of claim 7 wherein the liquid polythiol-terminated polymer is a liquid polysulfide polymer represented by the formula $$HS(C_2H_4-OCH_2-O-C_2H_4-SS)_{23}-C_2H_4-OCH_2-O-C_2H_4SH.$$

10. The process of claim 7 wherein the liquid polythiol-terminated polymer consists essentially of liquid polysulfide polymer having a molecular weight of from about 13,000 to about 15,000 and prepared by reacting dichloro diethyl formal with sodium polysulfide and using one-half mole percent of trichloropropane as a cross-linking agent.

11. The process of claim 7 wherein the fibrous filler is selected from nylon, polyester, rayon, asbestos and glass fibers.

12. The process as in claim 7 wherein the liquid polythiol-terminated polymer is semi-cured by heating said polymer in the presence of semi-curing curing agents.

* * * * *